(12) United States Patent
Oberg et al.

(10) Patent No.: US 8,526,279 B1
(45) Date of Patent: *Sep. 3, 2013

(54) METHOD AND APPARATUS FOR DETECTING WOBBLE DEFECTS IN OPTICAL RECORDING SYSTEM

(71) Applicant: Marvell International Ltd., Hamilton (BM)

(72) Inventors: Mats Oberg, Cupertino, CA (US); Joseph P. Tatman, Westminster, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,736

(22) Filed: Nov. 15, 2012

Related U.S. Application Data

(63) Continuation of application No. 13/311,353, filed on Dec. 5, 2011, now Pat. No. 8,315,136, which is a continuation of application No. 12/713,865, filed on Feb. 26, 2010, now Pat. No. 8,072,854.

(60) Provisional application No. 61/157,394, filed on Mar. 4, 2009.

(51) Int. Cl.
*G11B 7/00* (2006.01)

(52) U.S. Cl.
USPC ............... 369/47.28; 369/53.35; 369/124.15

(58) Field of Classification Search
USPC ............ 369/47.26–47.28, 47.5, 59.19, 59.23, 369/53.35, 53.36, 53.19
See application file for complete search history.

(56) References Cited

U.S. PATENT DOCUMENTS

| 6,683,830 | B2 | 1/2004 | Eom |
| 6,894,964 | B2 | 5/2005 | Park et al. |
| 7,483,353 | B2 | 1/2009 | Mashimo |
| 2005/0185549 | A1 | 8/2005 | Tsai et al. |
| 2007/0076543 | A1 | 4/2007 | Tazaki |
| 2008/0101168 | A1 | 5/2008 | Kobayashi |
| 2009/0040888 | A1 | 2/2009 | Liow et al. |
| 2009/0268570 | A1 | 10/2009 | Go et al. |
| 2010/0149940 | A1 | 6/2010 | Nakata et al. |

*Primary Examiner* — Wayne Young
*Assistant Examiner* — Brenda Bernardi

(57) ABSTRACT

Aspects of the disclosure provide an apparatus. The apparatus includes a pick-up unit, such as an optical pick-up unit, a wobble channel and a defect detector. The pick-up unit generates a push-pull signal corresponding to a wobbled track of a storage medium. The wobble channel includes circuits to receive the push-pull signal, obtain a wobble signal from the push-pull signal, and calculate a wobble amplitude metric based on the wobble signal. The defect detector compares the wobble amplitude metric to a threshold to detect wobble defects.

20 Claims, 7 Drawing Sheets

METHOD AND APPARATUS FOR DETECTING WOBBLE DEFECTS IN OPTICAL RECORDING SYSTEM

INCORPORATION BY REFERENCE

This present disclosure is a continuation of U.S. application Ser. No. 13/311,353, filed on Dec. 5, 2011, which is a continuation of U.S. application Ser. No. 12/713,865, filed on Feb. 26, 2010, which claims priority under 35 U.S.C. §119(e) to U.S. Provisional Application No. 61/157,394, filed on Mar. 4, 2009, the contents of each of which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a storage medium, such as an optical storage disc, wobbles a recording track to embed timing and address information. The timing and address information assists an optical recording device to record data at appropriate locations of the wobbled recording track. For example, the optical recording device can include an optical pick-up unit coupled with a wobble channel to extract the timing and address information. The optical pick-up unit generates a wobble signal corresponding to the wobbled recording track, and the wobble channel extracts the timing and address information from the wobble signal. Defects in the storage medium can cause disturbances to the timing and address information, and can cause loss of track to the timing and address information.

SUMMARY

Aspects of the disclosure can provide an apparatus. The apparatus includes a pick-up unit, such as an optical pick-up unit, a wobble channel and a defect detector. The pick-up unit generates a push-pull signal corresponding to a wobbled track of a storage medium, such as found on an optical disc. The wobble channel receives the push-pull signal, obtains a wobble signal from the push-pull signal, and calculates a wobble amplitude metric based on the wobble signal. The defect detector compares the wobble amplitude metric to a threshold to detect wobble defects.

In an embodiment, the wobble channel includes an envelope detector. The envelope detector detects a peak-to-peak envelope amplitude of the wobble signal. Then, the defect detector compares the peak-to-peak envelope amplitude to the threshold to detect the wobble defects.

In another embodiment, the wobble channel further includes a wobble demodulator to demodulate the wobble signal into an in-phase component and a quadrature component. Then, the wobble amplitude metric is calculated based on at least one of the in-phase component and the quadrature component. In an example, the wobble amplitude metric is calculated based on only one of the in-phase component or the quadrature component, such as an absolute value of the in-phase component, an absolute value of the quadrature component, and the like. In another example, the wobble amplitude metric is calculated based on a maximum of the in-phase component and the quadrature component, such as a maximum of absolute values of the in-phase component and the quadrature component. In another example, the wobble amplitude metric is calculated based on a quadratic mean of the in-phase component and the quadrature component, such as the quadratic mean, a square of the quadratic mean, and the like.

According to an aspect of the disclosure, the defect detector generates a defect signal indicative of a wobble defect when the wobble amplitude metric is smaller than the threshold. Further, at least one of the pick-up unit and the wobble channel is controlled based on the defect signal.

Aspects of the disclosure can provide a method of detecting wobble defects. The method includes generating a wobble signal in response to a wobbled track of a storage medium, calculating a wobble amplitude metric based on the wobble signal, comparing the wobble amplitude metric to a threshold, and detecting wobble defects based on the comparison.

Additionally, aspects of the disclosure can provide an integrated circuit (IC). The IC includes a wobble channel and a defect detector. The wobble channel receives a push-pull signal, obtains a wobble signal from the push-pull signal, and calculates a wobble amplitude metric based on the wobble signal. The defect detector compares the wobble amplitude metric to a threshold to detect wobble defects.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
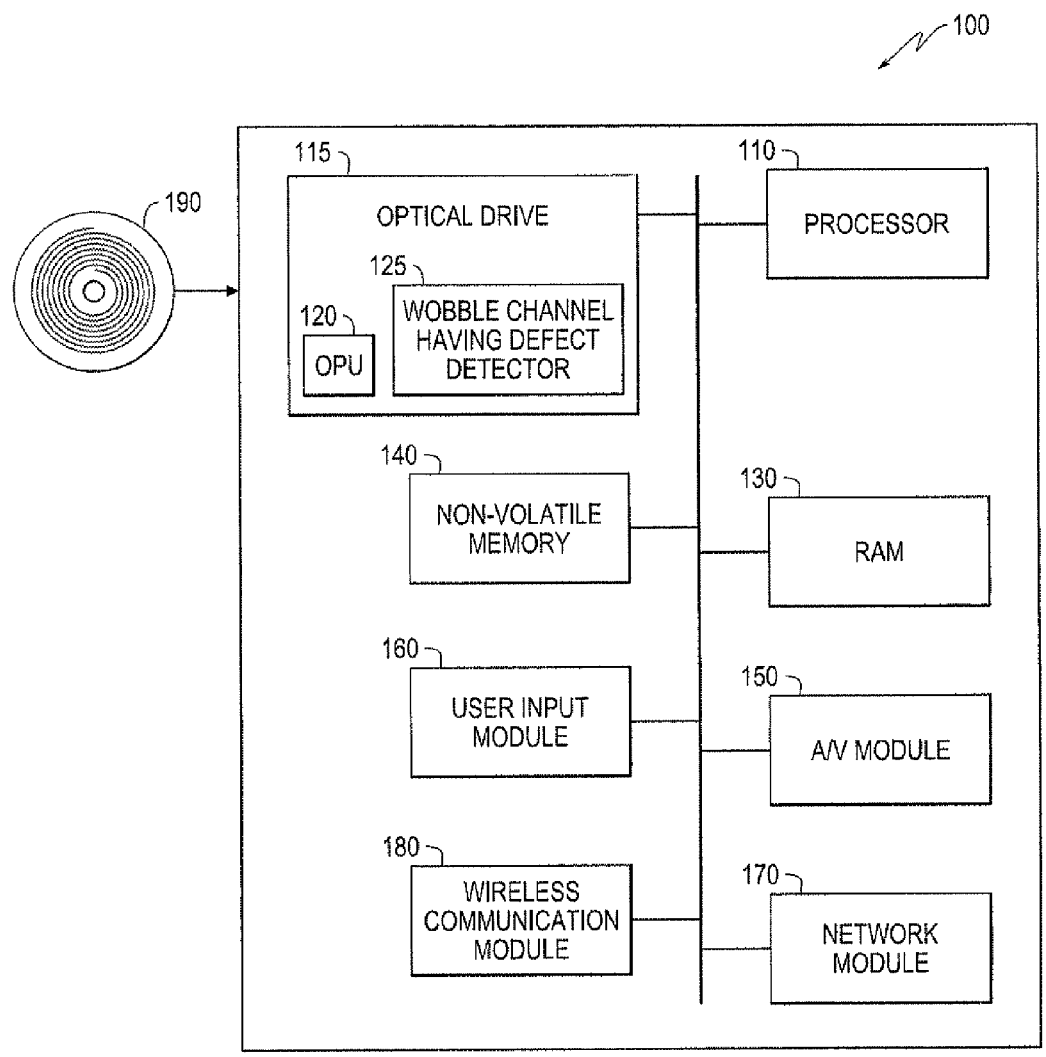
FIG. 1 shows a block diagram of a medium apparatus example and an optical disc example according to an embodiment of the disclosure.

FIG. 1 shows a block diagram of a medium apparatus example 100 and a storage medium, such as an optical disc example 190 according to an embodiment of the disclosure. The medium apparatus 100 includes a processor 110, an optical drive 115, a random access memory (RAM) unit 130, and a non-volatile memory 140. These elements can be coupled together as shown in FIG. 1.

The optical drive 115 includes various components, such as an optical pick-up unit (OPU) 120, a wobble channel 125 having a defect detector, and the like. The OPU 120 generates various electrical signals, such as push-pull signal, data signal, and the like, based on optical properties on the optical disc 190. The wobble channel 125 includes suitable circuits to obtain a wobble signal from the push-pull signal, and further obtain information embedded in the wobble signal. The embedded information can assist the OPU 120 to record data on the optical disc 190. Further, the defect detector of the wobble channel 125 detects wobble defects from the wobble signal, and generates a defect signal that is indicative of the detected wobble defects. The defect signal can be suitably used by the optical drive 115 to reduce disturbances due to the wobble defects.

The optical disc 190 can be any suitable optical disc, such as CD, DVD-R, DVD-RW, DVD+R, DVD+RW, HD, Blu-Ray, and the like. Generally, the optical disc 190 includes a spiral recording track, for example, in the form of a spiral groove adjacent to a spiral land. On the spiral recording track, user data can be stored on a recording layer by forming either data pits or data marks of different lengths and different spacings. The length of a pit, or the space between two pits denotes different information content or data information. To assist maintaining a uniform pit/mark length and pit/mark spacing, timing information and address information are embedded in the spiral groove and spiral land during disc manufacturing. In an example, the timing information is embedded by wobbling the spiral groove and/or the spiral land. Further, the address information is embedded by various techniques, such as land pre-pits, wobble phase modulation, and the like. In addition, disc information, such as manufacture, optical properties, and the like, is also embedded in the spiral groove and/or the spiral land during disc manufacturing.

The OPU 120 can be suitably configured to generate electrical signals in response to the embedded information on the optical disc 190. In an embodiment, the OPU 120 includes servomechanisms (not shown) to direct a laser beam to a location of the optical disc 190. The laser beam is reflected from the location of the optical disc 190. The reflected laser beam has light properties that correspond to information embedded at the location of the optical disc 190. The light properties are detected by a light detector (not shown) of the OPU 120. Further, the light detector of the OPU 120 converts the light properties to various electrical signals, such as a push-pull signal, and the like, for other components of the optical drive 115 to extract the embedded information.

In addition, the OPU 120 can be suitably configured to record user data on the optical disc 190 based on the extracted embedded information, such as the timing information, the address information, the disc information, and the like. In an embodiment, the servomechanisms of the OPU 120 are suitably controlled to direct a recording laser beam to a recording location of the optical disc 190. The recording location is determined based on the obtained address information. In addition, the recording laser beam is configured according to the obtained disc information, and the turn-on time of the recording laser beam is determined based on the obtained timing information.

The wobble channel 125 obtains the wobble signal from the push-pull signal, and detects wobbles in the wobble signal. Based on the detected wobbles, the wobble channel 125 obtains various information to assist controls of the optical drive 115. More specifically, the wobble channel 125 locks an internal clock to the wobble signal to obtain the embedded timing information in the wobbles. Further, the wobble channel 125 extracts the embedded address information, the embedded disc information, and the like, based on the locked wobble signal. Then, the extracted information is used by the optical drive 115 to control, for example, the servomechanisms, the recording laser, and the like.

However, the wobble signal can be disturbed due to wobble defects on the optical disc 190. The disturbances in the wobble signal can be detected by the defect detector in the wobble channel 125. Thus, appropriate actions can be taken to mitigate the effects of the wobble defects. For example, when wobble defects are detected, the controls of the servomechanisms and the recording laser can be maintained according to their previous statuses instead of being changed based on the wobble signal.

In an example when wobble defects on the optical disc 190 are not detected, the wobble defects disturb the wobble signal. The disturbances in the wobble signal can cause the wobble channel 125 to inaccurately detect the wobbles, and lose locking of the internal clock to the wobble signal. Thus, the timing information and the address information may be erroneously extracted, and the controls of the servomechanisms and the recording laser may be erroneously performed based on the disturbed wobble signal.

The processor 110 of the medium apparatus 100 executes system and application codes. The non-volatile memory 140 holds information even when power is off. Thus, the non-volatile memory 140 can be used to store system and application codes, such as firmware. The RAM unit 130 is readable and writable. Generally, the RAM unit 130 has a fast access speed. In an example, data and the codes are stored in the RAM unit 130 during operation, such that the processor 110 accesses the RAM unit 130 for the codes and the data instead of the non-volatile memory 140.

It is noted that the medium apparatus 100 can include more than one processor 110. In an example, the optical drive 115 includes a processor to execute software instructions for controlling the various components of the optical drive 115. It is also noted that the non-volatile memory 140 can include various non-volatile memory devices, such as battery backup RAM, read-only memory (ROM), programmable ROM (PROM), flash PROM, electrical erasable PROM (EE-PROM), magnetic storage, optical storage, and the like. The RAM unit 130 can also include various RAM devices, such as DRAM, SRAM, and the like.

The medium apparatus 100 can include various other components. In an embodiment, the medium apparatus 100 includes a user input module 160. The user input module 160 enables a user to control operations of the medium apparatus 100. The user input module 160 includes various user input devices, such as keyboard, mouse, touch screen, and the like. In addition, the user input module 160 includes interfaces for coupling external user input devices with the medium apparatus 100.

In another embodiment, the medium apparatus 100 includes an audio/video (A/V) module 150. The AN module 150 includes various video and audio devices, such as microphone, display screen, and the like. In addition, the A/V module 150 includes interfaces that couple external video and audio devices with the medium apparatus 100. In an example, the optical disc 190 stores video data and audio data. The video devices and audio devices play the video data and the audio data stored on the optical disc 190.

In another embodiment, the medium apparatus 100 includes communication modules, such as a network module 170, a wireless communication module 180, and the like. The network module 170 and the wireless communication module 180 enable the medium apparatus 100 to transmit the data stored on the optical disc 190 to other devices, or to store data received from the other devices onto the optical disc 190.

For ease and clarity of description, the embodiments are presented with a bus type architecture; however, it should be understood that any other architectures can also be used to couple components within the medium apparatus 100.

Figure 2:
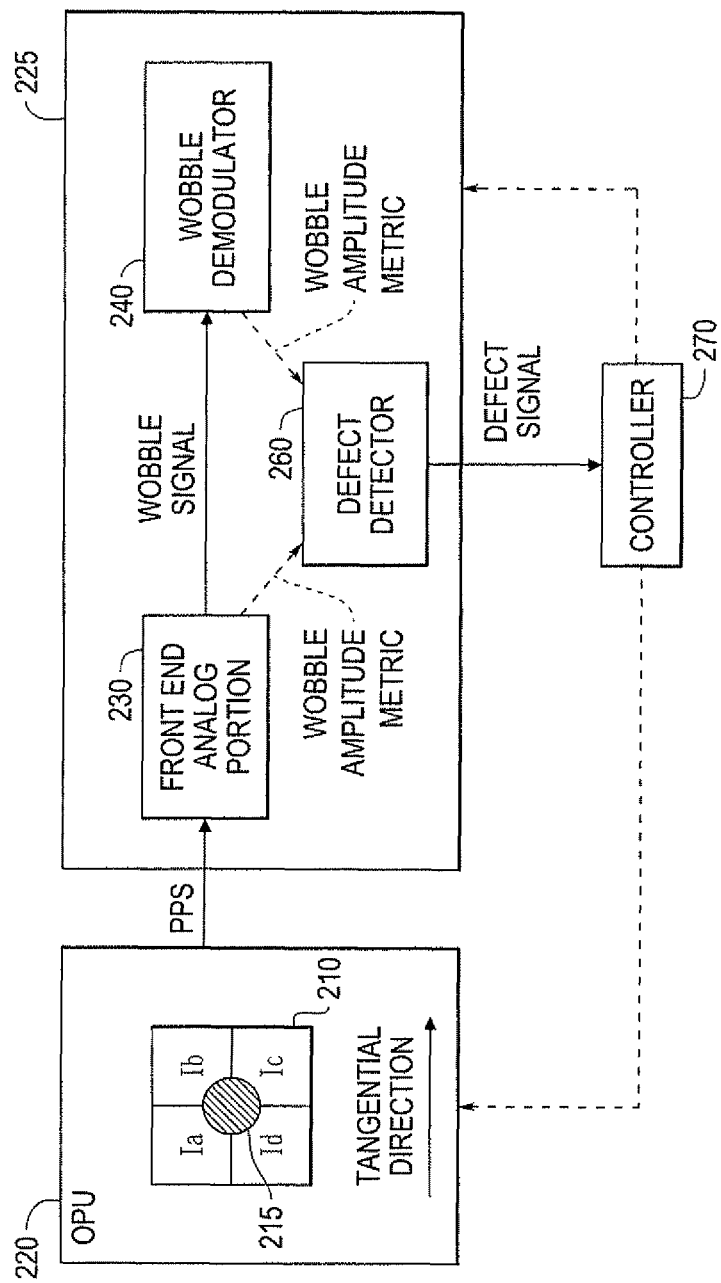
FIG. 2 shows a block diagram of a wobble channel example coupled with an optical pick-up unit example according to an embodiment of the disclosure.

FIG. 2 shows a block diagram of a wobble channel example 225 coupled with an optical pick-up unit (OPU) example 220 in an optical drive according to an embodiment of the disclosure. The wobble channel example 225 is a more detailed example of the wobble channel 125 in FIG. 1, and the OPU 220 is a more detailed example of the OPU 120 in FIG. 1. The wobble channel 225 includes a front-end analog portion 230, a wobble demodulator 240 and a defect detector 260. These elements are coupled together as shown in FIG. 2.

The OPU 220 includes a detector, such as a quadrant photo detector array 210 shown in FIG. 2. The quadrant photo detector array 210 includes four detectors to detect a light beam 215, and generates various signals, such as a push-pull signal (PPS), based on the light beam 215. In the FIG. 2 example, the push-pull signal is generated according to Eq. 1:

$$PPS = (I_a + I_b) - (I_c + I_d) \qquad \text{Eq. 1}$$

where $I_a$, $I_b$, $I_c$ and $I_d$ are current signals generated by the four detectors in response to the light beam 215 reflected from a wobbled recording track on a storage medium.

The front-end analog portion 230 receives the push-pull signal, regulates the push-pull signal, and outputs a wobble signal. The front-end analog portion 230 regulates the push-pull signal with analog techniques for various purposes, such as amplification, compensation for offsets, adjusting appropriate dynamic range, and the like. In an example, the front-end analog portion 230 includes an offset loop that adjusts the offsets of the push-pull signal. In another example, the front-end analog portion 230 includes a gain loop that adjusts an amplifier gain to regulate the push-pull signal to an appropriate dynamic range. Thus, the outputted wobble signal is suitable for subsequent circuit components to handle.

The wobble demodulator 240 receives the wobble signal, and extracts the timing information from the wobble signal. More specifically, the wobble demodulator 240 includes a phase-locked loop that locks an internal clock signal to the wobble signal to keep tracking timings embedded in the wobbled recording track. Then, the internal clock signal is used by components of an optical drive, such as the optical drive 115, to extract, for example, address information, disc information and the like, embedded in the wobbled recording track. In addition, the internal clock signal is used to record user data with regard to the wobbled recording track. Thus, the extraction and recording operations depend on a locking quality of the internal clock signal to the wobble signal.

Generally, the phase-locked loop locks the internal clock signal to the wobble signal based on a phase error. The phase error indicates a phase difference of the internal clock signal and the wobble signal, for example. The phase-locked loop pulls the phase error towards a stable point, such as zero. However, the phase error may shift from the stable point, due to various reasons, such as noises, disturbances, interferences, defects, and the like. The shifted phase error can result in errors in the decoded information.

Wobble defects, such as scratches, block dots, and the like, can cause large shifts in the phase error. In extreme cases, the wobble defects can cause loss of timing lock of the internal clock signal to the wobble signal. In an example, when the light beam 215 is reflected from a defective location on the wobbled recording track, the difference between the sum of $I_a$ and $I_b$, and the sum of $I_c$ and $I_d$ is reduced. Thus, the amplitude of the push-pull signal is reduced. In an extreme case, the push-pull signal does not correspond to the wobbled recording track. In such case, the phase error can be substantially random. The random phase error can cause the phase-locked loop to lose locking of the internal clock signal to the wobble signal.

According to an aspect of the disclosure, the defect detector 260 detects the wobble defects based on a wobble amplitude metric. The wobble amplitude metric is calculated based on the wobble signal. In an embodiment, the wobble amplitude metric is provided to the defect detector 260 by the front-end analog portion 230. Then, the defect detector 260 detects wobble defects based on the wobble amplitude metric provided by the front-end analog portion 230.

In another embodiment, the wobble amplitude metric is provided to the defect detector 260 by the wobble demodulator 240. Then, the defect detector 260 detects wobble defects based on the wobble amplitude metric provided by the wobble demodulation 240.

The defect detector 260 outputs a defect signal corresponding to the wobble defect detection based on the wobble amplitude metric. In an example, the defect detector 260 outputs logic one when the wobble amplitude metric is smaller than a threshold and outputs logic zero when the wobble amplitude metric is larger than the threshold. In an embodiment, the defect signal is provided to a controller 270. The controller 270 can control the operations of components in the optical drive, such as the OPU 220, the wobble channel 225, and the like, based on the defect signal.

In an example, the controller 270 controls a servomechanism (not shown) within the OPU 220 based on the defect signal. More specifically, when the defect signal indicates no defect in the wobble signal, the servomechanism operates based on the wobble signal, for example, adjusts parameters based on the wobble signal. When the defect signal indicates wobble defects in the wobble signal, the servomechanism ignores the wobble signal for a time duration, or until the defect signal indicates no defect in the wobble signal. The defect signal can be used by other components, such as an offset loop, a gain loop, a timing loop, and the like, to reduce disturbances due to the wobble defects.

In an embodiment, the front-end analog portion 230, the wobble demodulator 240 and the defect detector 260 are implemented as integrated circuit modules in one or more integrated circuit (IC) chips. The IC chips can further include other circuit modules, such as controller module, encoder module, decoder module, memory module, network module, and the like. The IC chips can be coupled with the OPU 220 in an optical drive.

Figure 3A:
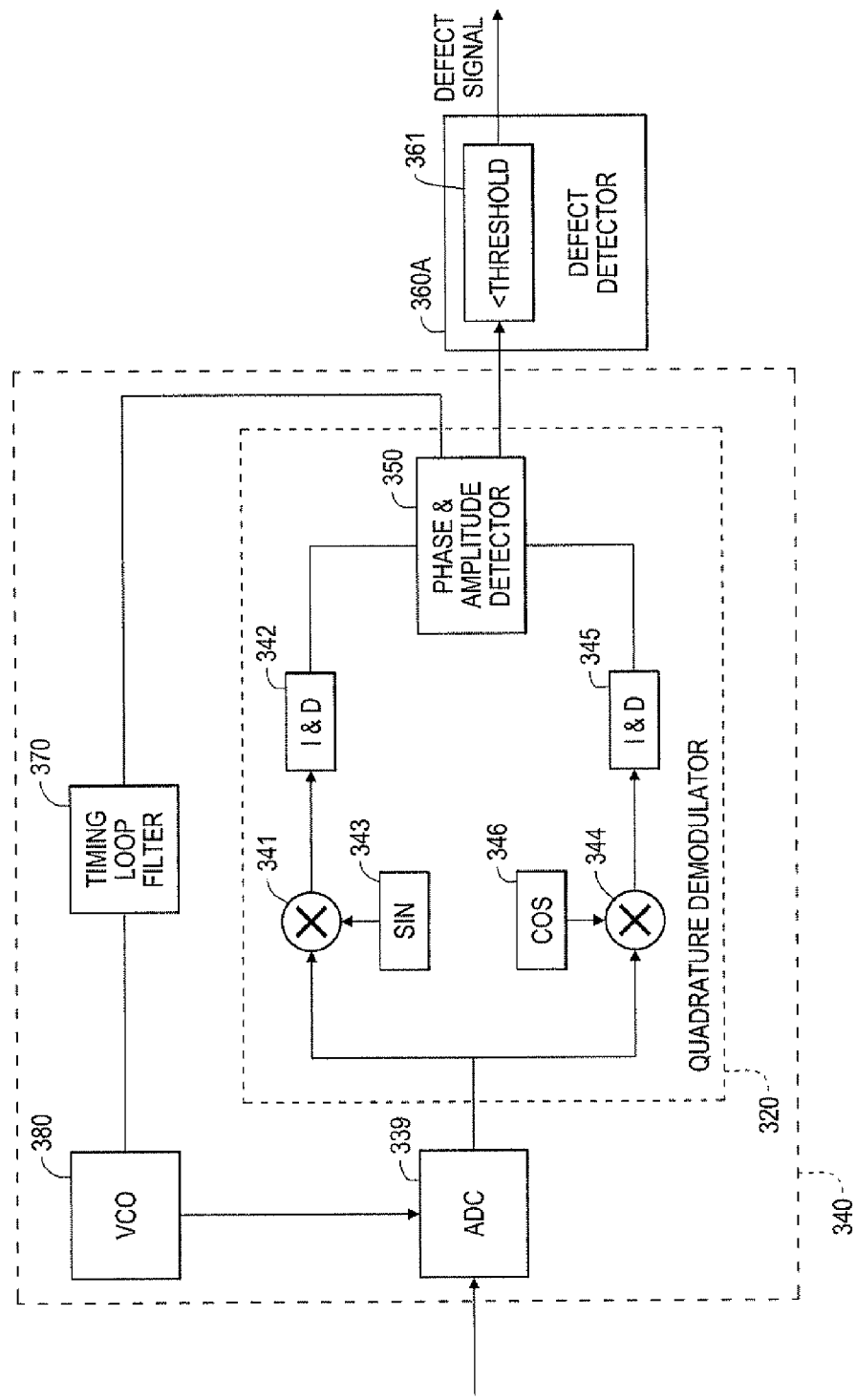
FIG. 3A shows a block diagram of a wobble demodulator example coupled with a defect detector example according to an embodiment of the disclosure.

FIG. 3A shows a block diagram of a wobble demodulator 340 coupled with a defect detector example 360A according to an embodiment of the disclosure. The wobble demodulator 340 is implemented as a timing loop including a quadrature demodulator 320, an analog-to-digital converter (ADC) 339, a timing loop filter 370, and a voltage control oscillator (VCO) 380. These elements are coupled together as shown in FIG. 3A.

The ADC 339 converts the wobble signal into a discrete wobble signal based on a sampling clock signal from VCO 380. The quadrature demodulator 320 computes a phase error signal between an internal clock (not shown) and the discrete wobble signal.

The timing loop filter 370 receives the phase error signal, and outputs a voltage signal based on the phase error signal. The voltage signal is received by the VCO 380 to generate the sampling clock signal.

The quadrature demodulator 320 demodulates the discrete wobble signal with regard to the internal clock. More specifically, the quadrature demodulator 320 includes two parallel signal processing paths to generate a quadrature component and an in-phase component of the discrete wobble signal with regard to the internal clock. The path to generate the in-phase component includes a sine signal generator 343 of the internal clock, a multiplier 341 and an integrate and dump filter (I&D) 342. The path to generate the quadrature component includes a cosine signal generator 346 of the internal clock, a multiplier 344 and an integrate and dump filter (I&D) 345. Subsequently, the quadrature and the in-phase components are used by a phase and amplitude detector 350 to generate the phase error as well as a wobble amplitude metric. The wobble amplitude metric is used by the defect detector 360A to detect wobble defects.

During operation, for example, the sampling clock signal from the VCO 380 samples the wobble signal to obtain the discrete wobble signal. On the in-phase path, the discrete wobble signal is multiplied with a sine signal of the internal clock by the multiplier 341. Further, the multiplied signal is integrated over a period by the integrate and dump filter 342 to obtain the in-phase component.

On the quadrature path, the discrete wobble signal is multiplied with a cosine signal of the internal clock by the multiplier 344. Further, the multiplied signal is integrated over a period by the integrate and dump filter 345 to obtain the quadrature component. Subsequently, the quadrature component and the in-phase component are used by the phase and amplitude detector 350 to detect the phase error, for example using an arctangent function. In addition, the phase and amplitude detector 350 calculates a wobble amplitude metric based on the in-phase component and the quadrature component. In an example, the phase and amplitude detector 350 calculates a quadratic mean of the in-phase component and the quadrature component, as shown by Eq. 2:

$$\text{Quadratic Mean} = \sqrt{Q^2 + I^2} \qquad \text{Eq. 2}$$

where Q denotes the quadrature component, and I denotes the in-phase component. Then, the wobble amplitude metric is calculated based on the quadratic mean. In an example, the wobble amplitude metric is the quadratic mean. In another example, the wobble amplitude metric is a square of the quadratic mean.

Further, the timing loop filter 370 obtains a feedback portion based on the phase error. The feedback portion is used by the VCO 380 to adjust the sampling clock signal, such as its phase and frequency. Therefore, the sampling clock signal samples the wobble signal with a desired frequency and a desired phase. In an example, the wobble demodulator 340 is configured to lock the internal clock to the wobble signal with zero phase error.

The internal clock is used by other components of an optical drive to control operation timings. Therefore, the other components can operate corresponding to the wobble signal as a result of the internal clock being locked to the wobble signal. However, due to wobble defects and other reasons, such as noises, and the like, the phase error of the wobble signal and the internal clock can be errantly shifted from, for example, zero. The non-zero phase error can result in actions of the wobble demodulator 340 to erroneously attempt to lock the internal clock to the wobble signal having defect disturbances. The actions of the wobble demodulator 340 can cause the internal clock to lose locking to the wobble signal.

The defect detector 360A declares a defect based on the wobble amplitude metric provided by the phase and amplitude detector 350. In an embodiment, the defect detector 360A includes a comparator 361. The comparator 361 compares the wobble amplitude metric with a threshold to detect wobble defects. In an example, if the wobble amplitude metric is smaller than the threshold, the defect detector 360A detects a wobble defect, and outputs logic one as the defect signal; otherwise, the defect detector 360A outputs logic zero as the defect signal.

In an embodiment, the defect signal can be used by the timing loop filter 370 to reduce disturbances due to the wobble defects. In an example, the timing loop filter 370 is configured to disregard the phase error corresponding to the defect signal being logic one.

Figure 3B:
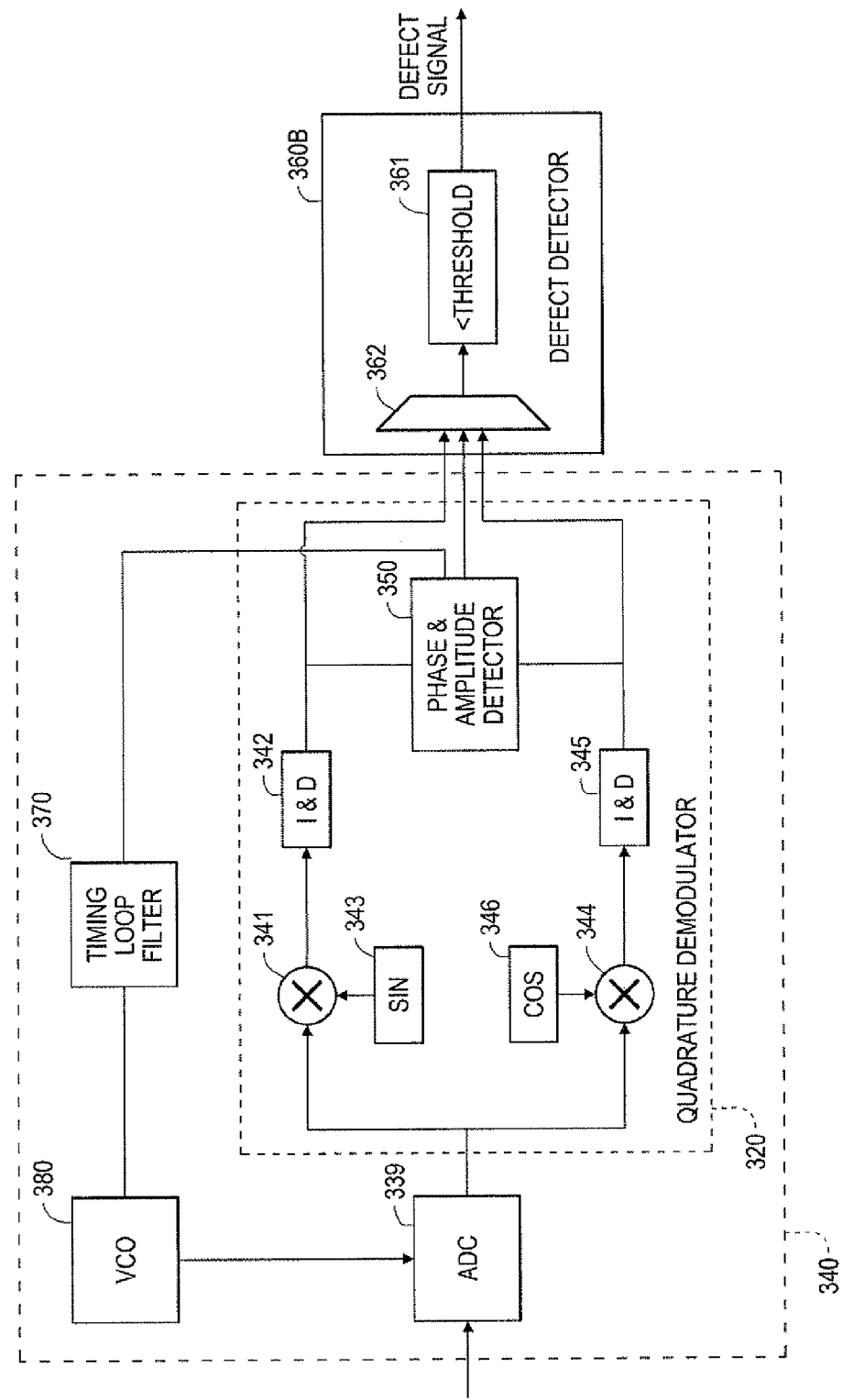
FIG. 3B shows another block diagram of a wobble demodulator example coupled with a defect detector example according to an embodiment of the disclosure.

FIG. 3B shows another block diagram of the wobble demodulator 340 coupled with a defect detector example 360B according to an embodiment of the disclosure. The defect detector 360B includes a multiplexer 362 coupled with the comparator 361. The multiplexer 362 receives the in-phase component from the integrate and dump filter 342, the quadrature component from the integrate and dump filter 345, and a combination of the in-phase component and the quadrature component, such as a quadratic mean of the in-phase component and the quadrature component, a maximum of the in-phase component and the quadrature component, and the like, provided by the phase and amplitude detector 350. The multiplexer 362 can be suitably controlled to select one of the in-phase component, the quadrature component, and the combination of the in-phase component and the quadrature component, and provide the selected to the comparator 361. Then, the comparator 361 compares the selected to a suitable threshold, and generates the defect signal based on the comparison.

It is noted that suitable operations can be conducted on the in-phase component and/or the quadrature component. In an example, positive values are used in the defect detector 360B to detect defects. Thus, absolute values of the in-phase components and the quadrature component are calculated and provided to the multiplexer 262. Further, the absolute values are used to determine the maximum of the in-phase component and the quadrature component.

It is noted that the multiplexer 362 can be removed, and the comparator 361 is suitably coupled to the integrated and dump filter 342, the integrated and dump filter 345 and/or the phase and amplitude detector 350. In an example, the comparator 361 is coupled to the integrate and dump filter 342 to receive the in-phase component, and the comparator 361 generates the defect signal based on comparing the in-phase component to a suitable threshold. In another example, the comparator 361 is coupled to the integrate and dump filter 345 to receive the quadrature component, and the comparator 361 generates the defect signal based on comparing the quadrature component to a suitable threshold. In another example, the comparator 361 is coupled to the phase and amplitude detector 350 to receive a maximum of the in-phase component and the quadrature component, and the comparator 361 generates the defect signal based on comparing the maximum of the in-phase component and the quadrature component to a suitable threshold. In another example, the comparator 361 is coupled to both the integrate and dump filter 342 and the integrate and dump filter 345 to receive both the in-phase component and the quadrature component. The comparator 361 can include any suitable comparison algorithm, or any suitable comparison logic to generate the defect signal based on comparing the in-phase component and/or the quadrature component, or functions of the in-phase and/or quadrature components to suitable thresholds.

Figure 4:
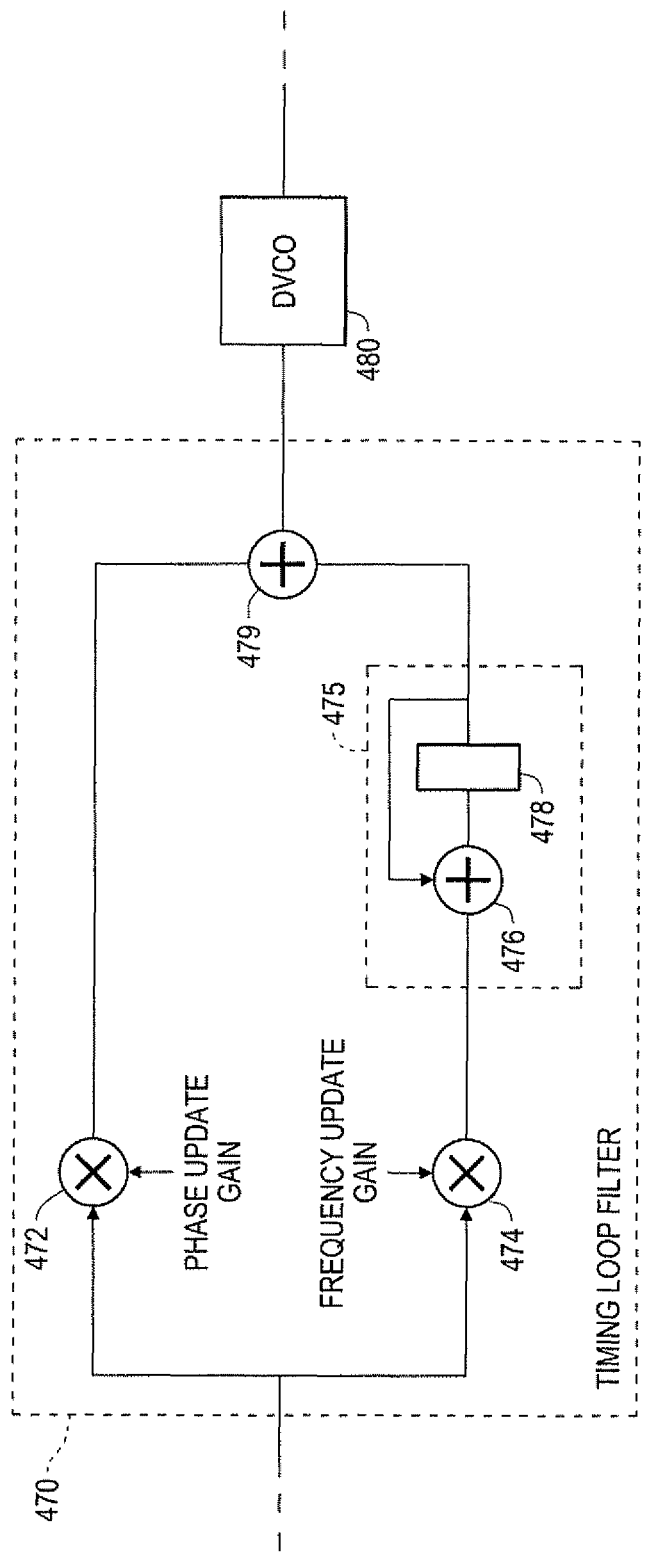
FIG. 4 shows a block diagram of a timing loop filter example coupled with a digital voltage control oscillator (DVCO) example according to an embodiment of the disclosure.

FIG. 4 shows a block diagram of a timing loop filter example 470 coupled with a digital voltage control oscillator (DVCO) example 480 according to an embodiment of the disclosure. The timing loop filter 470 includes a phase path and a frequency path to generate a control signal for the DVCO 480. The phase path includes a first multiplier 472 to generate a phase component. The frequency path includes a second multiplier 474 and an integrator 475 to generate the frequency component. The integrator 475 includes a first adder 476 and a register 478. Further, the timing loop filter 470 includes a second adder 479 to combine the phase component and the frequency component to generate the control signal. These elements are coupled together as shown in FIG. 4.

The first multiplier 472 multiplies the phase error with a phase update gain to generate the phase component. The phase update gain can be tunable. For example, the phase update gain can be tuned to one of 16 values. In an example, when wobble defects are detected, for example, as indicated by the defect signal being logic one, the phase update gain is tuned to a suitable value, such as zero, to disregard the phase error.

The second multiplier 474 multiplies the phase error with a frequency update gain. Then, the integrator 475 integrates the multiplied phase error to generate the frequency component. More specifically, the first adder 476 adds the multiplied phase error to a previous frequency component to generate a current frequency component. The register 478 holds the previous frequency component. The previous frequency components is then used to generate the current frequency component. The frequency update gain can be tunable. For example, the frequency update gain can be tuned to one of 16 values. In an example, when wobble defects are detected, for example, as indicted by a defect signal being logic one, the frequency update gain is tuned to a suitable value, such as zero, to disregard the phase error.

Further, the second adder 479 combines the phase component and the frequency component to generate the control signal for the DVCO 480. In an embodiment, the DVCO 480 includes a digital representation of a voltage signal. The control signal is used to adjust the digital representation of the voltage signal. The DVCO 480 further includes a digital to analog converter (DAC) (not shown). The DAC converts the digital representation to the voltage signal. Further, the voltage signal is used to control a voltage control oscillator (VCO) to generate the sampling clock accordingly.

Figure 5:
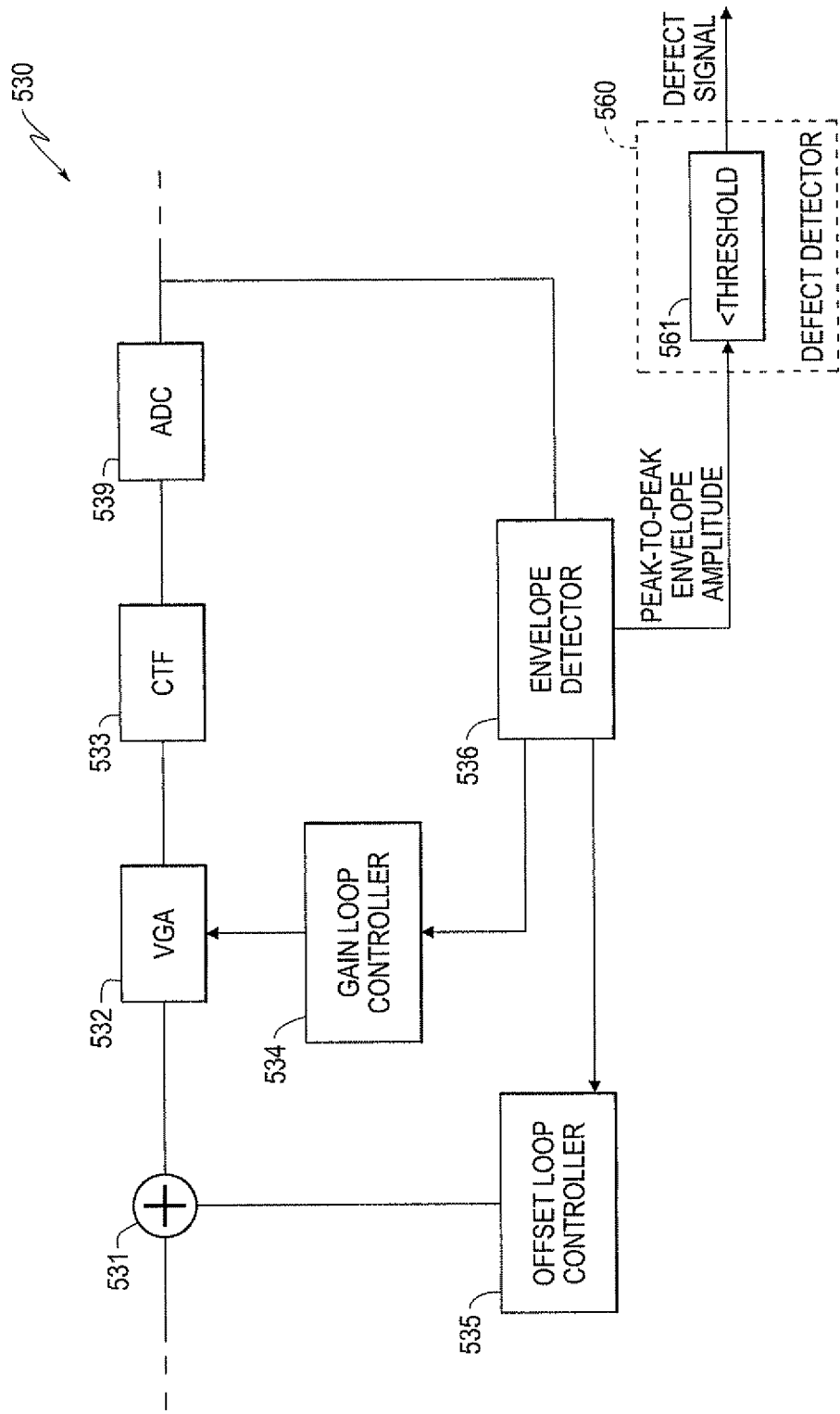
FIG. 5 shows a block diagram of a front-end portion in a wobble channel example according to an embodiment of the disclosure.

FIG. 5 shows a block diagram of a front-end portion example 530 coupled to a defect detector 560 according to an embodiment of the disclosure. The front-end portion 530 includes an offset adder 531, a variable gain amplifier (VGA) 532, a continuous time filter (CTF) 533, an analog to digital converter (ADC) 539, an envelope detector 536, a gain loop controller 534, and an offset loop controller 535. These elements are coupled together as shown in FIG. 5.

The offset adder 531, the VGA 532, and the CTF 533 regulate a received analog signal to have desired properties. For example, the offset adder 531 adjusts the analog signal with an offset provided by the offset loop controller 535. The VGA 532 amplifies the analog signal with a gain controlled by the gain loop controller 534. The CTF 533 truncates a noise bandwidth of the analog signal, for example.

The ADC 539 obtains a discrete wobble signal by sampling the regulated analog signal. The envelope detector 536 detects envelopes of the discrete wobble signal. Then, the offset loop controller 535 generates the offset based on the envelopes, and the gain loop controller 534 generates the gain based on the envelopes. Also, the defect detector 560 detects wobble defects based on the envelopes. In an embodiment, the defect detector 560 detects the wobble defects based on a peak-to-peak envelope amplitude. In an example, the defect detector 560 includes a comparator 561. The comparator 561 compares the peak-to-peak envelope amplitude to a threshold to generate a defect signal. For example, when the peak-to-peak envelope amplitude is smaller than the threshold, the comparator 561 outputs logic one as a defect signal to indicate a wobble defect; otherwise, the comparator 561 outputs logic zero.

It is noted that the envelope detector 536 and the front-end portion 530 can be suitably adjusted to detect wobble signal envelopes before the wobble signal is sampled by the ADC 539.

Figure 6:
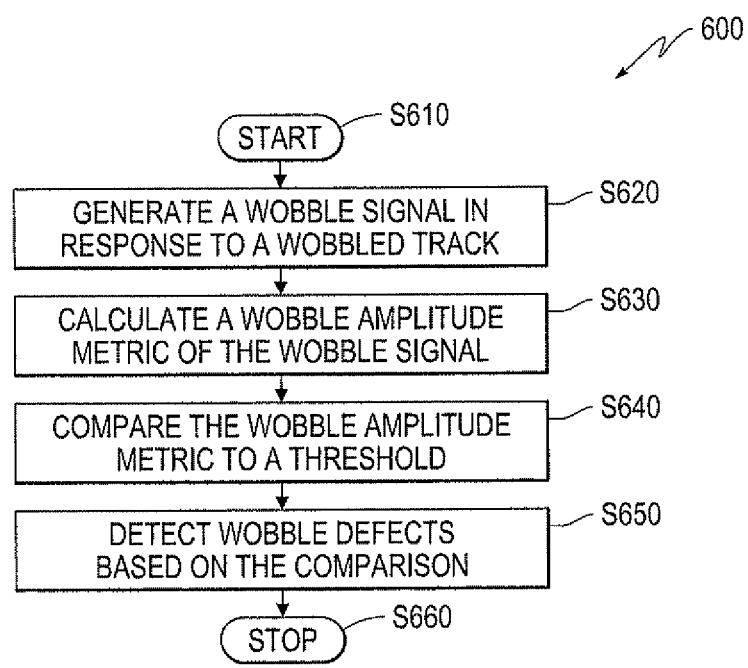
FIG. 6 shows a flow chart outlining a process example for detecting wobble defects according to an embodiment of the disclosure.

FIG. 6 shows a flow chart outlining a process example 600 for an optical drive to detect wobble defects according to an embodiment of the disclosure. The process 600 starts at S610, and proceeds to S620.

At S620, the optical drive generates a wobble signal in response to a wobbled recording track. In an example, the optical drive includes an OPU, such as the OPU 220, and a wobble channel, such as the wobble channel 225. The OPU directs a laser beam onto the wobbled recording track, and detects a reflected laser beam. The OPU generates a push-pull signal in response to the reflected laser beam. The wobble channel 225 regulates the push-pull signal to generate the wobble signal.

At S630, the optical drive calculates a wobble amplitude metric. In an embodiment, the wobble channel 225 includes an envelope detector to detect a peak-to-peak envelope amplitude of the wobble signal. In another embodiment, the wobble channel 225 includes a wobble demodulator. The wobble demodulator demodulates the wobble signal with regard to an internal clock to generate an in-phase component and a quadrature component. The in-phase component and the quadrature component can be used to calculate a phase error of the wobble signal to the internal clock. In addition, at least of the in-phase component and the quadrature component can be used to calculate the wobble amplitude metric. In an example, the wobble amplitude metric is calculated based on only the in-phase component. For example, the wobble amplitude metric is calculated as an absolute value of the in-phase component, or a scaled in-phase component. In another example, the wobble amplitude metric is calculated based on a maximum of the in-phase component and the quadrature component. For example, the wobble amplitude metric is calculated as a maximum of absolute values of the in-phase component and the quadrature component. In another example, the wobble amplitude metric is calculated based on a quadratic mean of the in-phase component and the quadrature component. For example, the wobble amplitude metric is calculated as the quadratic mean or a square of the quadratic mean.

At S640, the optical drive compares the wobble amplitude metric to a threshold. In an example, the optical drive compares the peak-to-peak envelope amplitude to a threshold. In another example, the optical drive compares an absolute value of the in-phase component to a threshold. In another example, the optical drive compares the maximum of the absolute value of the in-phase component and the absolute value of the quadrature component to a threshold. In another example, the optical drive compares the quadratic mean of the in-phase component and the quadrature component to a threshold.

At S650, the optical drive detects wobble defects based on the comparison. In an example, when the wobble amplitude metric is smaller than the threshold, the optical drive outputs a defect signal indicative of a wobble detect, such as the defect signal being logic one. Otherwise, the optical drive outputs logic zero as the defect signal, for example. The defect signal can be used by the optical drive to adjust various components to reduce disturbances due to the wobble defects. Then, the process proceeds to S660 and terminates.

It is noted that the process 600 can be continuously performed by the optical drive during a recording process. It is also noted that the threshold can be static or dynamic, and can be suitably calibrated for different wobble amplitude metrics.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. An apparatus, comprising:
    a wobble channel configured to receive a first signal corresponding to a wobbled track of a storage medium;
    a demodulator that is configured to demodulate a second signal from the first signal to calculate a wobble amplitude metric; and
    a detector configured to compare the wobble amplitude metric to a threshold to detect wobble defects.

2. The apparatus of claim 1, further comprising:
    a pick-up unit configured to generate the first signal.

3. The apparatus of claim 1, wherein the demodulator is further configured to demodulate the second signal into a plurality of components, and to calculate the wobble amplitude metric based on at least one of the plurality of components.

4. The apparatus of claim 3, wherein the wobble amplitude metric is calculated based on a maximum of absolute values of the plurality of components.

5. The apparatus of claim 3, wherein the wobble amplitude metric is calculated based on a quadratic mean of the plurality of components.

6. The apparatus of claim 2, wherein the pick-up unit is an optical pick-up unit.

7. The apparatus of claim 1, further comprising:
    a pick-up unit configured to generate the first signal, wherein the detector is further configured to generate a third signal indicative of a wobble defect when the wobble amplitude metric is smaller than the threshold.

8. The apparatus of claim 7, wherein at least one of the pick-up unit and the wobble channel is controlled based on the third signal.

9. A method of detecting wobble defects, comprising:
    generating a signal in response to a wobbled track of a storage medium;
    demodulating the signal to calculate a wobble amplitude metric;
    comparing the wobble amplitude metric to a threshold; and
    detecting wobble defects based on the comparison.

10. The method of claim 9, wherein demodulating the signal to calculate the wobble amplitude metric further comprises:
    demodulating the signal into a plurality of components; and
    calculating the wobble amplitude metric based on at least one of the plurality of components.

11. The method of claim 10, wherein calculating the wobble amplitude metric further comprises:
    calculating the wobble amplitude metric based on a maximum of absolute values of the plurality of components of the signal.

12. The method of claim 10, wherein calculating the wobble amplitude metric further comprises:
    calculating the wobble amplitude metric based on a quadratic mean of the plurality of components of the signal.

13. The method of claim 9, wherein generating the signal further comprises:
    converting a light signal reflected from the wobble track to the signal.

14. An integrated circuit (IC), comprising:
    a wobble channel configured to receive a first signal, and to obtain a second signal from the first signal, the wobble channel including a demodulator that is configured to demodulate the second signal to calculate a wobble amplitude metric; and
    a detector configured to compare the wobble amplitude metric to a threshold to detect wobble defects.

15. The IC of claim 14, wherein the demodulator is further configured to demodulate the second signal into a plurality of components, and to calculate the wobble amplitude metric based on at least one of the plurality of components.

16. The IC of claim 15, wherein the wobble amplitude metric is calculated based on a maximum of absolute values of the plurality of components.

17. The IC of claim 15, wherein the wobble amplitude metric is calculated based on a quadratic mean of the plurality of components.

18. The IC of claim 14, wherein the detector is further configured to generate a third signal indicative of a wobble defect when the wobble amplitude metric is smaller than the threshold.

19. The IC of claim 18, wherein the wobble channel is controlled based on the third signal.

20. The IC of claim 14, further comprising:
    a pick-up unit configured to generate the first signal corresponding to a wobbled track of a storage medium.

* * * * *